US008200079B2

(12) United States Patent
Seo (10) Patent No.: US 8,200,079 B2
(45) Date of Patent: Jun. 12, 2012

(54) CAMERA MODULE (75) Inventor: Tae-Jun Seo, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 138 days.

(21) Appl. No.: 12/662,975

(22) Filed: May 13, 2010

(65) Prior Publication Data
US 2011/0097063 A1 Apr. 28, 2011

(30) Foreign Application Priority Data

Oct. 23, 2009 (KR) .......................... 10-2009-0101033

(51) Int. Cl.
*G03B 17/00* (2006.01)
(52) U.S. Cl. ........................................................ 396/73
(58) Field of Classification Search .................. 396/71, 396/73
See application file for complete search history.

(56) References Cited

U.S. PATENT DOCUMENTS

| 3,875,401 A * | 4/1975 | Stauffer ..................... 250/201.8 |
| 4,937,609 A * | 6/1990 | Wakabayashi et al. ......... 396/73 |
| 6,477,325 B1 * | 11/2002 | Tobioka ............................ 396/6 |
| 2007/0198138 A1 * | 8/2007 | Wernersson ..................... 701/1 |

FOREIGN PATENT DOCUMENTS

| JP | 11-14878 | 1/1999 |
| JP | 2004-45652 | 2/2004 |

OTHER PUBLICATIONS

Korean Office Action issued Feb. 11, 2011 in corresponding Korean Patent Application 10-2009-0101033.

* cited by examiner

*Primary Examiner* — Clayton E LaBalle
*Assistant Examiner* — Noam Reisner (57) ABSTRACT There is provided a camera module. The camera module includes a housing accommodating a lens barrel in which a lens is arranged, a close range lens provided in the housing and covering the lens at the time of shooting at close range, and a driving unit driving the close range lens to cover the lens.

5 Claims, 6 Drawing Sheets

CAMERA MODULE

CROSS-REFERENCE TO RELATED APPLICATIONS

This application claims the priority of Korean Patent Application No. 10-2009-0101033 filed on Oct. 23, 2009, in the Korean Intellectual Property Office, the disclosure of which is incorporated herein by reference.

BACKGROUND OF THE INVENTION

1. Field of the Invention

The present invention relates to a camera module, and more particularly, to a camera module mounted on a personal mobile terminal or the like and having an image capturing function.

2. Description of the Related Art

Recently, the development of communications technologies and digital information processing technologies has led to emerging technologies associated with portable terminals equipped with a variety of functions such as information processing and operation, communications, image information input/output and the like.

Examples of such portable terminals may include personal digital assistants (PDA) having digital camera and communications functions, portable phones having a digital camera function, and personal multi-media players (PMP).

Furthermore, the development of digital camera technologies and information storage capacity has generalized the mounting of high-performance digital camera modules on personal portable terminals and the like.

Also, according to consumers' propensities, personal portable terminals have been gradually transformed into multi-media devices utilizing various peripheral devices such as camera modules, mobile communications modules and the like. This allows the consumers to use various functions regardless of location and time.

Here, the various functions may refer to multimedia services for storing, transmitting and providing still images and videos as well as voice and data.

In this regard, the personal portable terminals need to be equipped with functions requiring shooting at close range, and technologies allowing for shooting at even closer range are in demand.

SUMMARY OF THE INVENTION

An aspect of the present invention provides a camera module capable of shooting at close range.

According to another aspect of the present invention, there is provided a camera module including: a housing accommodating a lens barrel in which a lens is arranged; a close range lens provided in the housing and covering the lens at the time of shooting at close range; and a driving unit driving the close range lens to cover the lens.

The close range lens may have a circular shape corresponding to a shape of the lens.

The close range lens may include two semicircular lenses joined together to form a single circle.

The close range lens may include a plurality of circular lenses for magnification control.

The driving unit may include: a rotary bar connected to an end portion of the close range lens; and a motor mounted to rotate the rotary bar.

The driving unit may include a solenoid rotating the close range lens using an electromagnetic force.

The driving unit may include a moving lever formed integrally with the close range lens and moving along a guide recess formed in the housing.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

A camera module, according to exemplary embodiments of the present invention, will be described in more detail with reference to FIGS. 1 through 6. Hereinafter, concrete exemplary embodiments of the present invention will be described in detail with reference to accompanying drawings.

Exemplary embodiments of the present invention will now be described in detail with reference to the accompanying drawings. The invention may, however, be embodied in many different forms and should not be construed as being limited to the embodiments set forth herein. While those skilled in the art could readily devise many other varied embodiments that incorporate the teachings of the present invention through the addition, modification or deletion of elements, such embodiments may fall within the scope of the present invention.

Like reference numerals in the drawings denote like elements.

Figure 1:
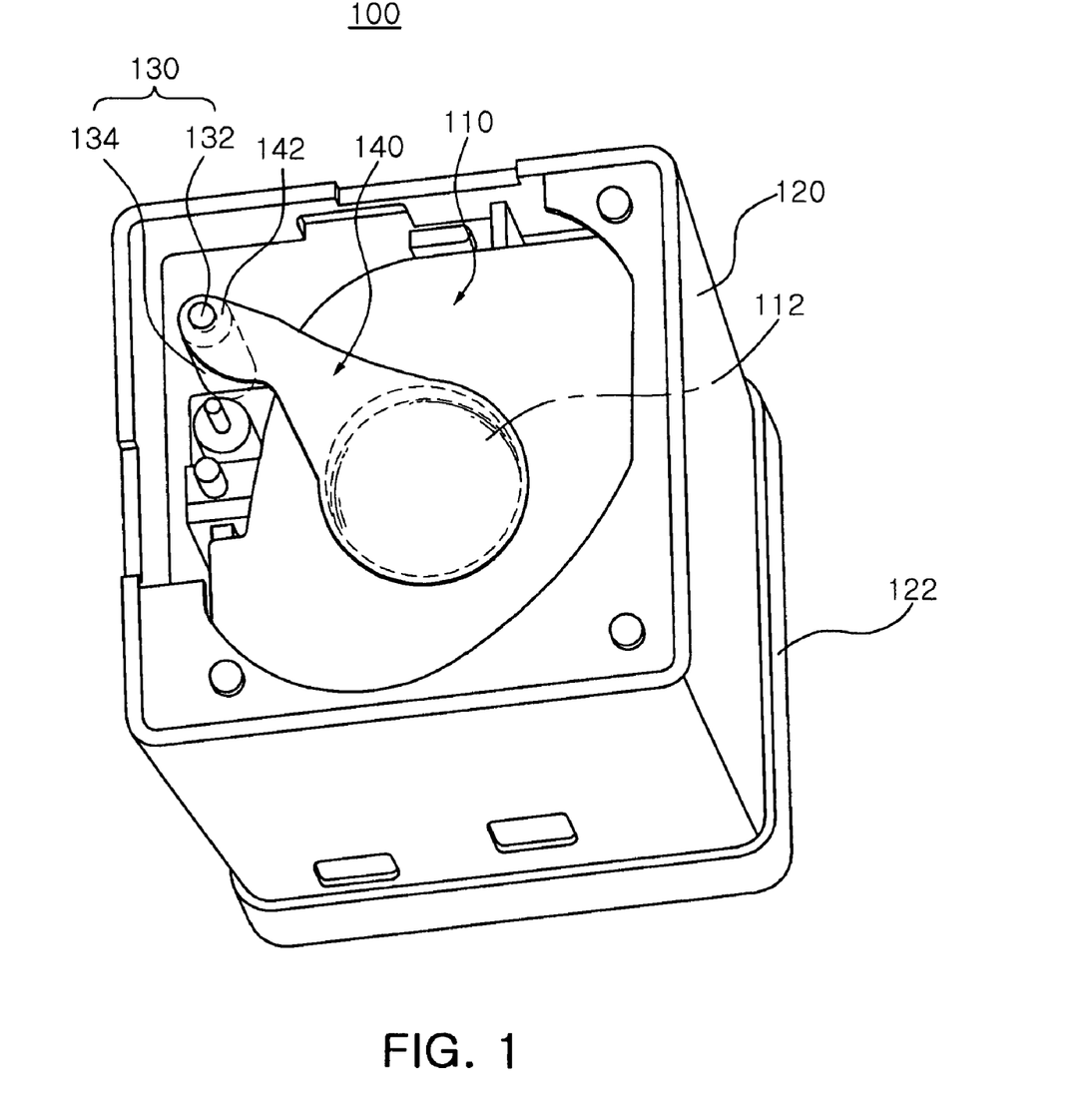
FIG. 1 is a perspective view illustrating a camera module according to an exemplary embodiment of the present invention.
Figure 2:
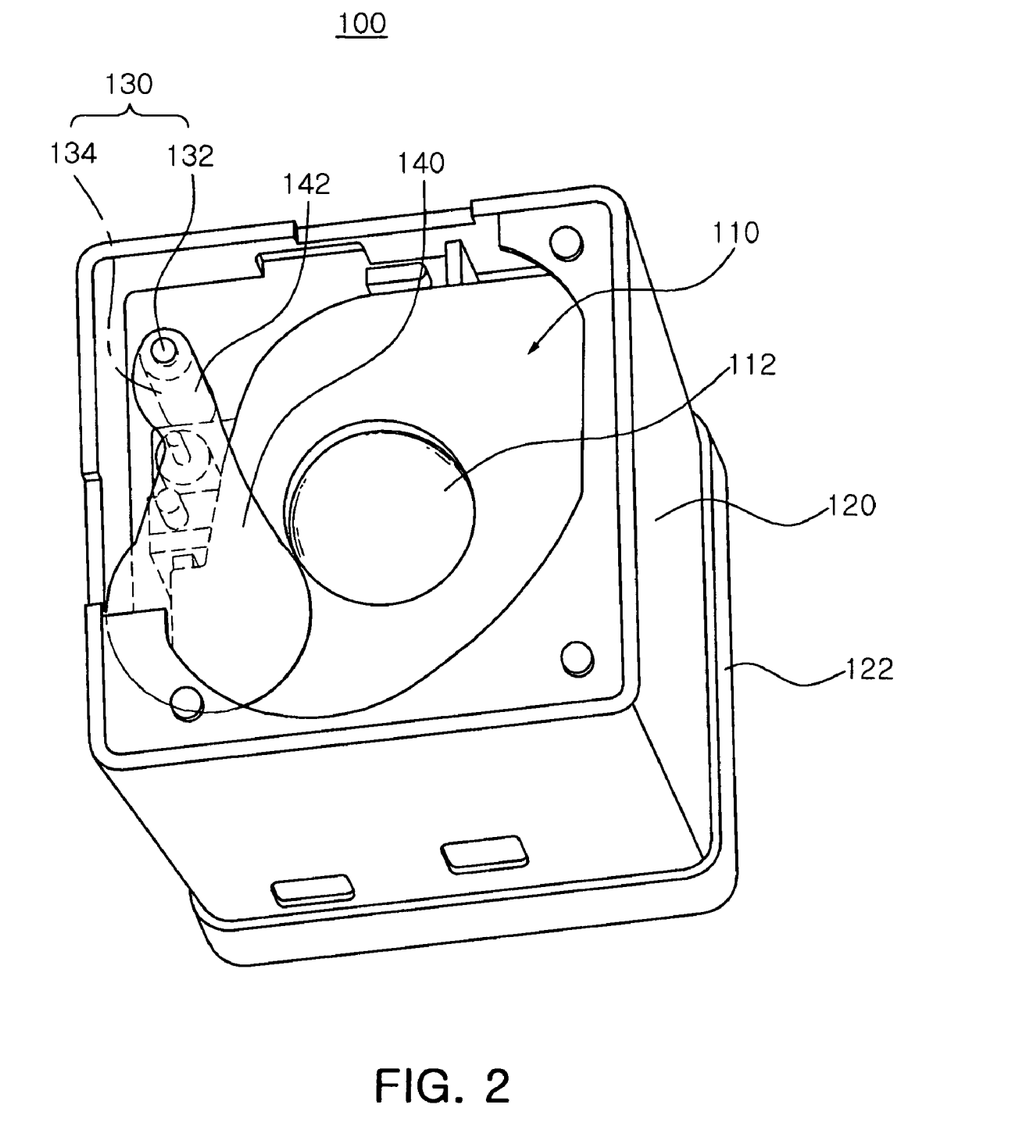
FIG. 2 is a perspective view illustrating how a close range lens is moved in the camera module depicted in FIG. 1.

FIG. 1 is a perspective view illustrating a camera module according to an exemplary embodiment of the present invention, and FIG. 2 is a perspective view illustrating how a close range lens is moved in the camera module depicted in FIG. 1.

Referring to FIGS. 1 and 2, a camera module 100 includes a lens barrel 110, a housing 120, a driving unit 130 and a close range lens 140.

The lens barrel 110 has an inner space of a predetermined size. The lens barrel 110 has a hollow cylindrical shape, and at least one lens 112 is arranged along an optical axis therein. The lens barrel 110 may have a lens hole for light transmission. The lens hole may be formed in the top surface of the lens barrel 110 in a penetrating manner.

Although not shown in detail, at least one spacer may be mounted inside the lens barrel 110 so as to maintain a uniform interval between adjacent lenses. However, the number of lenses arranged in the lens barrel 110 is not limited, provided that at least one lens is disposed.

An actuator (not shown) may be mounted in the vicinity of the lens barrel 110. When power is supplied, the actuator can reciprocate the lens in the direction of an optical axis.

The actuator may be provided in a variety of configurations, such as a voice coil motor (VCM) or a piezo actuator.

Here, the voice coil motor (VCM), using a magnet and coil, moves a lens by an electromagnetic force generated by the interlinkage between an electric field, generated by applying power to the coil, and a magnetic field, generated from the magnet. The piezo actuator, using a piezoelectric body, moves a lens by the deformation of the piezoelectric body occurring when power is applied thereto.

The housing 120 accommodates the lens barrel 110 such that the lens 112 is exposed to the outside. The housing 120 has an open bottom. A substrate 122 is bonded with the open bottom of the housing 120 and is thus fixed. Accordingly, the housing 120 serves as a frame accommodating the lens barrel 110, and may serve to protect internal configurations from external conditions.

The housing 120 may include an infrared (IR) filter bonded with the inside of the housing 120. This infrared filter filters infrared rays among rays having transmitted the lens 112. Here, the infrared filter is not an essential element in the present invention.

The substrate 122 is fixed to one surface of the housing 120 by being bonded thereto using a bonding agent. An image sensor may be mounted on the top surface of the substrate 122 such that it coincides with the direction of the optical axis of the lens.

Here, the image sensor is an imaging device that has an image forming region on its upper surface to form an image from light incident thereupon through the lens, and converts this into an electrical signal.

The driving unit 130 may include a rotary bar 132 connected to the end portion of the close range lens 140, and a motor 134 mounted in order to rotate the rotary bar 132. However, the driving unit 130 is not limited to the description, and a variety of driving units may be selectively used according to a designer's intention.

The close range lens 140 is mounted on the outer surface of the housing 120, and is connected rotatably by the driving unit 130.

Here, the close range lens 140 may utilize a macro lens or the like. The size thereof may correspond to the size of the lens 112.

The close range lens 140 may have a connection portion 142 at its end portion for the rotatable connection to the driving unit 130. This connection structure allows the close range lens 140 to be rotated together with the driving unit 130.

As shown in FIG. 2, when the driving unit 130 rotates while the close range lens 140 is covering the front side of the lens 112, the close range lens 140 is rotated to thereby open the front side of the lens 112.

Accordingly, a user, when intending to take a close range shot, may manipulate a personal mobile terminal so that the close range lens 140 covers the front side of the lens 112.

The camera module, according to this embodiment, is provided inside the housing 120, and includes the close range lens 140 that covers the lens 112 at the time of a close range shot. This enables selective shooting between close range shots and long range shots. Also, a separate auto focusing unit is unnecessary, thereby reducing manufacturing costs.

Typically, in the case that an auto focusing unit is placed therein, a camera module needs to have a height long enough to allow for the movement of the lens barrel 110. However, according to this embodiment, a reduction in the height of the camera module can be achieved since no auto focusing unit is used.

Figure 3:
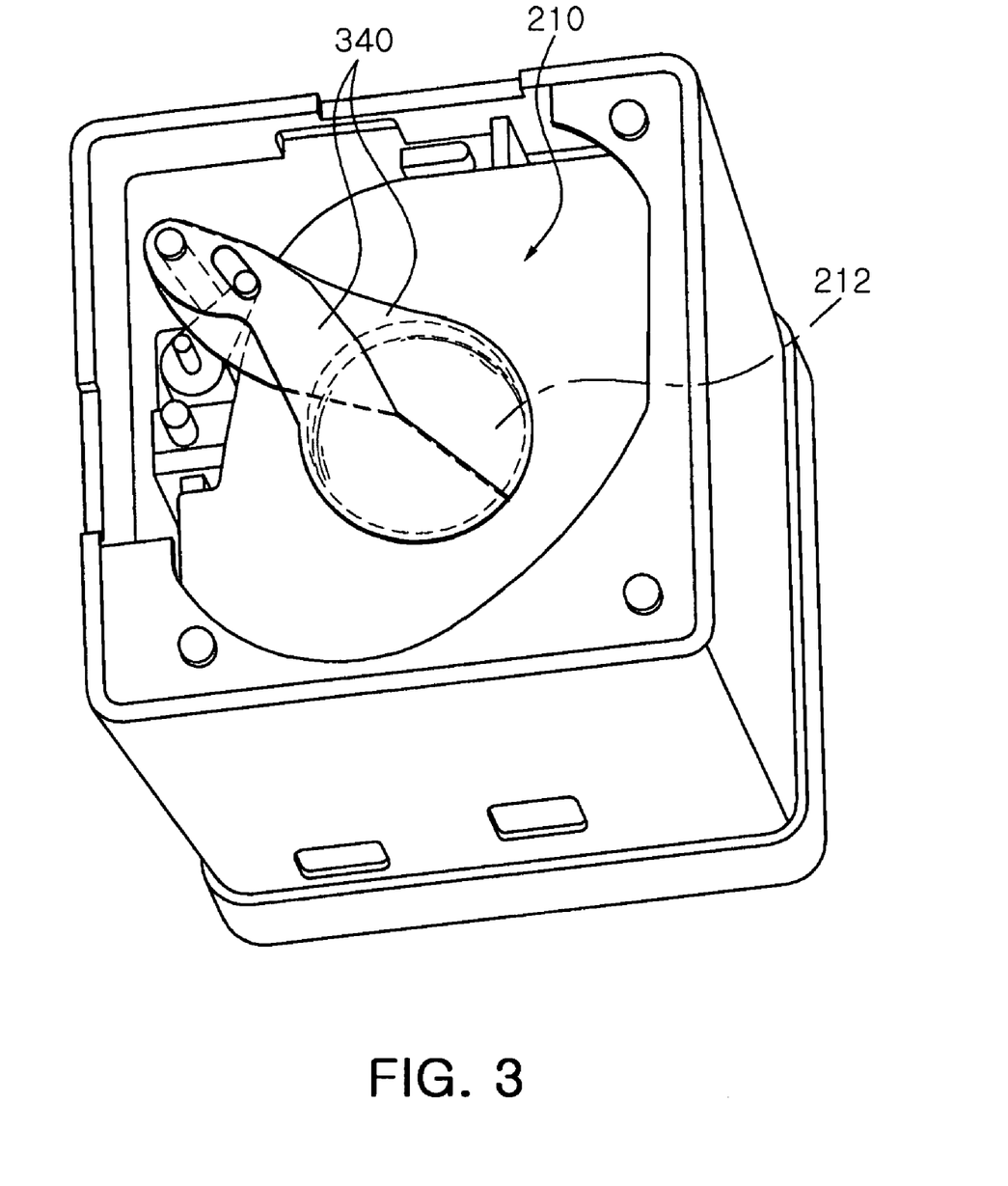
FIG. 3 is a perspective view illustrating a camera module according to another exemplary embodiment of the present invention.
Figure 4:
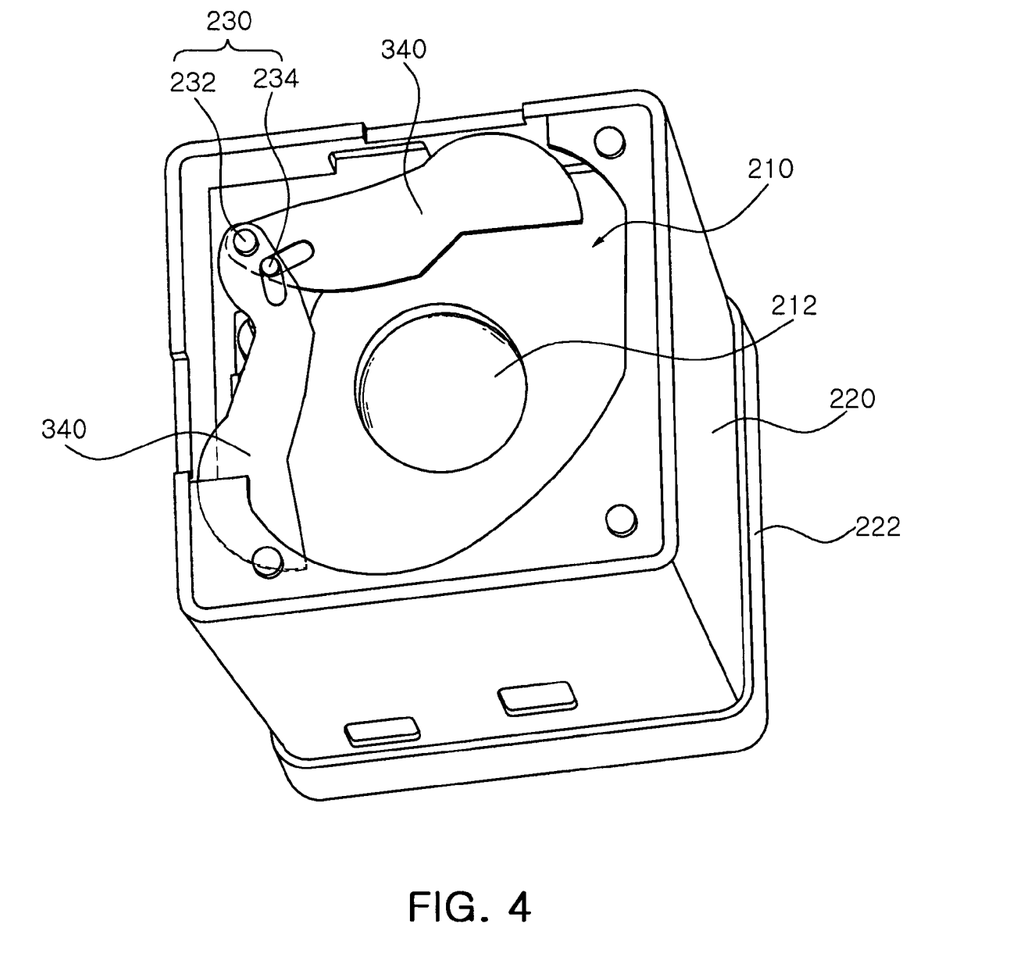
FIG. 4 is a perspective view illustrating how a plurality of close range lenses are moved in the camera module depicted in FIG. 3.

FIG. 3 is a perspective view illustrating a camera module according to another exemplary embodiment of the present invention, and FIG. 4 is a perspective view illustrating how a plurality of close range lenses are moved within the camera module depicted in FIG. 3.

Referring to FIGS. 3 and 4, a camera module 200 includes a lens barrel 210, a housing 220, a driving unit 230 and a close range lens 340.

The configurations of the lens barrel 210 and the housing 220, according to this embodiment, are substantially the same as those of the previous embodiment. Thus, a detailed description thereof may be omitted.

The driving unit 230 may include a swivel hinge 232 and a driving motor 234.

Here, the swivel hinge 232 is connected to the end portions of two close range lenses 340 so as to fix these close range lenses 340. Accordingly, the close range lenses 340 are rotated about the swivel hinge 232.

Here, the close range lenses 340 may have semicircular shapes corresponding to the shape of the lens 212 arranged in the lens barrel 210. The two close range lenses 340, when rotated, are joined together.

The driving motor 234 includes a rotor (not shown) that rotates. The rotor may be mounted in holes respectively formed in the end portions of the close range lenses 340.

In detail, as shown in FIG. 3, the close range lenses 340 may have a semicircular shape corresponding to the shape of the lens 212 of the lens barrel 210. The two close range lenses 340, when rotated, may be joined together to thereby form a single circular shape.

However, the close range lenses are not limited to the described semicircular shape, and may have a circular shape according to a designer's intention. Alternatively, a plurality of close range lenses having a circular shape may be disposed along an optical axis. In this case, lens magnification may be adjusted arbitrarily by a user.

As shown in FIG. 4, when the rotor moves to a joint end of the holes of the close range lenses 340, the close range lenses 340 are moved to both sides so that the lens 212 of the lens barrel 210 is exposed.

However, the close range lenses 340 are not limited to the above description. The close range lenses 340 may be connected separately to the swivel hinge so that they are independently controlled. The driving motor is not limited to the above description, and may be provided in the form of a solenoid that rotates the close range lenses using an electromagnetic force according to a designer's intention.

According to this embodiment, the semicircular shape of the close range lenses 340 is contributive to reducing the distance at which those close range lenses 340 are moved at the time when they are moved to both sides.

Figure 5:
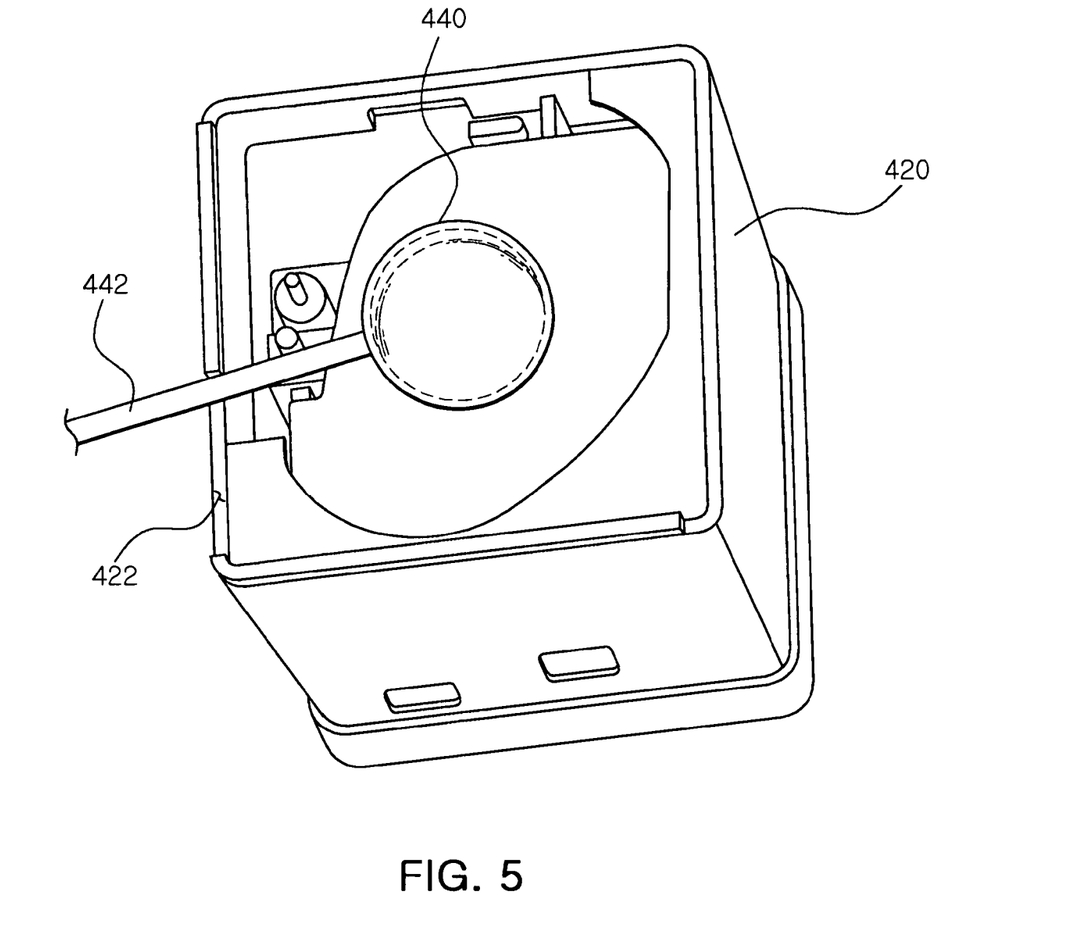
FIGS. 5 and 6 are perspective views illustrating how a close range lens is moved in a camera module according to another exemplary embodiment of the present invention.
Figure 6:
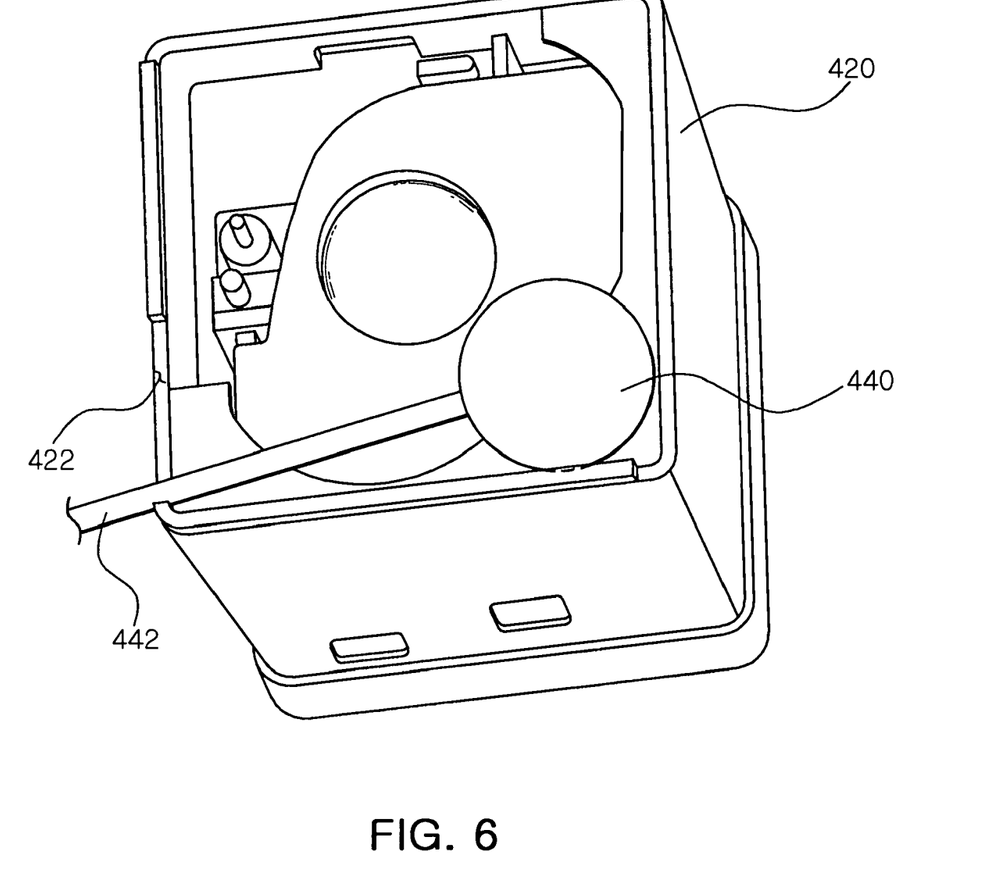

FIGS. 5 and 6 are perspective views illustrating how a close range lens is moved in a camera module according to another exemplary embodiment of the present invention.

Referring to FIGS. 5 and 6, a close range lens 440 is mounted on the outer surface of the housing 420, and a lever 442 extends from the side surface of the close range lens 440 to the outside.

The housing 420 may have a guide recess 422 on the side surface of the housing 420. The guide recess 422 is opened to allow the lever 442 to extend to the outside, and guides the direction in which the lever 442 moves.

The lever 442 is connected to a switch formed on the outer side of a personal portable terminal. Thus, when a user manually moves the switch in a downward direction, the lever 442 is moved along the guide recess 422.

Consequently, the camera module, according to this embodiment, includes the close range lens 440 provided in the housing 420 and covering the lens at the time of shooting at close range. This allows for selective shooting between close range shots and long range shots.

Also, since the close range lens 440 is moved using a simple structure, relatively low costs are required when realizing this structure.

As set forth above, according to exemplary embodiments of the invention, the camera module includes the close range lens provided in the housing and covering the lens for a close range shot. Thus, a separate auto focusing unit is not required, thereby reducing manufacturing costs. Furthermore, such a camera module, according to the present invention, can achieve a reduction in the height of the camera module, and enables selective shooting between close range shots and long range shots.

While the present invention has been shown and described in connection with the exemplary embodiments, it will be apparent to those skilled in the art that modifications and variations can be made without departing from the spirit and scope of the invention as defined by the appended claims.

What is claimed is:

1. A camera module comprising:
 a housing accommodating a lens barrel in which a lens is arranged;
 a close range lens provided in the housing and covering the lens at the time of shooting at close range; and
 a driving unit driving the close range lens to cover the lens, wherein the close range lens comprises two semicircular lenses joined together to form a single circle.

2. The camera module of claim 1, wherein the close range lens comprises a plurality of circular lenses overlapping each other for magnification control.

3. The camera module of claim 1, wherein the driving unit comprises:
 a rotary bar connected to an end portion of the close range lens; and
 a motor mounted to rotate the rotary bar.

4. The camera module of claim 1, wherein the driving unit comprises a solenoid rotating the close range lens using an electromagnetic force.

5. The camera module of claim 1, wherein the driving unit includes a moving lever formed integrally with the close range lens and moving along a guide recess formed in the housing.

* * * * *

UNITED STATES PATENT AND TRADEMARK OFFICE
CERTIFICATE OF CORRECTION

PATENT NO. : 8,200,079 B2  
APPLICATION NO. : 12/662975  
DATED : June 12, 2012  
INVENTOR(S) : Tae Jun Seo It is certified that error appears in the above-identified patent and that said Letters Patent is hereby corrected as shown below:

First Page Col. 1 (Inventor), Line 1, Delete "Tae-Jun Seo" and insert -- Tae Jun Seo --, therefor.

Signed and Sealed this
Twenty-eighth Day of August, 2012

David J. Kappos
*Director of the United States Patent and Trademark Office*